US011883349B2

(12) United States Patent
Sullivan et al.

(10) Patent No.: US 11,883,349 B2
(45) Date of Patent: Jan. 30, 2024

(54) MOBILITY DEVICE FOR VARYING SURFACES

(71) Applicant: Jaclyn Sullivan, Mokena, IL (US)

(72) Inventors: Jaclyn Sullivan, Mokena, IL (US); Kimberly Kozub, Lockport, IL (US)

(73) Assignee: Jaclyn Sullivan, Mokena, IL (US)

(*) Notice: Subject to any disclaimer, the term of this patent is extended or adjusted under 35 U.S.C. 154(b) by 93 days.

(21) Appl. No.: 17/519,387

(22) Filed: Nov. 4, 2021

(65) Prior Publication Data

US 2023/0136051 A1 May 4, 2023

(51) Int. Cl.
*A61H 3/04* (2006.01)
*A45B 9/04* (2006.01)

(52) U.S. Cl.
CPC ......... *A61H 3/04* (2013.01); *A61H 2003/046* (2013.01); *A61H 2201/01* (2013.01); *A61H 2201/1683* (2013.01)

(58) Field of Classification Search
CPC .......... A45B 9/04; A61H 3/0288; A47B 91/06
See application file for complete search history.

(56) References Cited

U.S. PATENT DOCUMENTS 1,709,686 A * 4/1929 Ryan .................... A61H 3/0288 135/80
2,376,776 A * 5/1945 Jones ................... A61H 3/0288 135/86
2,527,180 A * 10/1950 Evens .................. A61H 3/0288 135/79
3,814,160 A * 6/1974 Creasey ................ B60C 11/005 152/209.5
4,411,283 A 10/1983 Lucarelli
5,224,506 A 7/1993 Allen et al.

(Continued)

FOREIGN PATENT DOCUMENTS

| | | | | |
|---|---|---|---|---|
| CN | 206167319 | 5/2017 | | |
| CN | 108175646 | 6/2018 | | |
| CN | 210812342 | 6/2020 | | |
| CN | 213553468 | 6/2021 | | |
| WO | WO-2006019303 A1 * | 2/2006 | ............... | A45B 9/04 |

OTHER PUBLICATIONS

"Lumex 5" Fixed Walker Wheels—Replacement Rollator Accessories, Rubber Wheel Universal Design with 8 Adjustment Holes, 1 Pair, 603650A", retrieved on Oct. 4, 2021, 7 pages, https://www.amazon.com/Lumex-603650A-Walker-Diameter-Silver/dp/B008SI9QGA/ref=sr_1_10?_encoding=UTF8&c=ts&dchild=1&keywords=Walker+%26+Rollator+Replacement+Wheels&qid=1633361615&s=hpc&sr=1-10&ts_id=3777041.

(Continued)

*Primary Examiner* — Noah Chandler Hawk
(74) *Attorney, Agent, or Firm* — STEPTOE LLP; Daniel F. Gelwicks; Robert Ford Kappers

(57) ABSTRACT

The present disclosure relates to devices and systems related to a modular leg component for a mobility walker. Namely, a device including a leg component that includes a first surface and a second surface is described. The first surface and the second surface may be constructed from materials with a different hardness from one another. The surfaces are configured to be movable relative one another. For example, at least one of the first surface or the second surface is rotatable about an axis such that in a first configuration the first surface is arranged to contact a ground surface and in a second configuration the second surface is arranged to contact the ground surface.

20 Claims, 3 Drawing Sheets

(56) References Cited

U.S. PATENT DOCUMENTS

| | | | | |
|---|---|---|---|---|
| 5,573,213 | A * | 11/1996 | Henderson | A47B 91/06 248/346.11 |
| 6,338,493 | B1 | 1/2002 | Wohlgemuth et al. | |
| 7,779,850 | B2 | 8/2010 | Caldwell et al. | |
| 8,408,224 | B2 | 4/2013 | Ozuna et al. | |
| 8,789,547 | B1 | 7/2014 | Reda | |
| 9,468,271 | B2 * | 10/2016 | Troy, Jr. | A45B 9/04 |
| 10,039,688 | B1 | 8/2018 | Epp | |
| 10,786,420 | B2 | 9/2020 | FitzPatrick et al. | |
| 2012/0274037 | A1 | 11/2012 | Miller | |
| 2013/0168931 | A1 | 7/2013 | Baraitaru | |
| 2015/0144166 | A1 * | 5/2015 | Turner | A61H 3/00 135/77 |

OTHER PUBLICATIONS

"Drive Medical Universal Walker Wheels, 5-in , 1-Pair", retrieved on Oct. 4, 2021, 7 pages, https://www.lowes.com/pd/Drive-Medical-Universal-Walker-Wheels-5-in-1-Pair/1000688030?cm_mmc=shp-_-c-_-prd-_-kab-_-bng-_-PLA_KAB_223_Bathroom-Storage-Accessories-_-1000688030-_-0-_-0-_-0&ds_rl=1286981&msclkid=cc1fc79f775013735b99a6c4685b07c6&utm_source=bing&utm_medium=cpc&utm_campaign=PLA_KAB_223_Bathroom-Storage-Accessories&utm_term=4585444529460616&utm_content=KAB_Accessible.

"Walker Wheels 5" Set of 2", retrieved on Oct. 4, 2021, 7 pages, https://www.lowes.com/pd/Drive-Medical-Universal-Walker-Wheels-5-in-1-Pair/1000688030?cm_mmc=shp-_-c-_-prd-_-kab-_-bng-_-PLA_KAB_223_Bathroom-Storage-Accessories-_-1000688030-_-0-_-0-_-0&ds_rl=1286981&msclkid=cc1fc79f775013735b99a6c4685b07c6&utm_source=bing&utm_medium=cpc&utm_campaign=PLA_KAB_223_Bathroom-Storage-Accessories&utm_term=4585444529460616&utm_content=KAB_Accessible.

"HealthSmart Walker Glides, Walker Caps or Walker Pads also for Rollators, Universal Fit, Pack of 2", retrieved on Sep. 27, 2021, 5 pages, https://www.ubuy.mv/en/catalog/product/view/id/47052/s/healthsmart-walker-glides-walker-glide-caps-walker-slides-tips-green-2-count.

* cited by examiner

MOBILITY DEVICE FOR VARYING SURFACES

BACKGROUND

Mobility devices, including canes, walkers, and wheelchairs are often prescribed for and used by older adults or those with a physical disability due to injury or illness in order to compensate for decrements in balance, coordination, sensation, strength, and increased risk for falls. While sometimes prescribed by a physician and dispensed under guidance from a physical therapist, these devices are also available for purchase to the general public.

In particular, walkers are designed for people who require assistance with mobility or balancing and can provide additional support when walking. The use of a walker helps people struggling with mobility regain the feeling of independence and confidence in one's daily life while lowering the fear of losing balance and falling. Walkers are frequently accompanied by accessories that customize the use of walkers and include cup holders, walker baskets, rubber glides, walker balls, oxygen holders, and other spare attachments.

SUMMARY

Devices and systems disclosed herein relate to mobility devices and systems with integrated and interchangeable feet surfaces for use on varying ground surfaces. Namely, a modular leg component or leg-end module includes at least a first surface and a second surface, and a user is able to change between the two surfaces depending on the user's environment. The two surfaces have different physical properties, such as hardness and coefficient of friction, but are integrated into a single modular device. The leg-end module may be attached to the legs of a standard mobility walker using a telescoping lock mechanism.

In one aspect, a device is provided. The device includes a leg component that may be configured to attach to a mobility walker, namely a back leg of a mobility walker. The leg component includes at least a first surface and a second surface. The surfaces may be located at a distal end of the leg component and configured to interface with a ground surface, which the mobility walker may glide, slide, roll, or otherwise move across. The first surface has at least one physical property different than the second surface. For example, the first surface is constructed from a material with a first hardness while the second material is constructed from a material with a second hardness. In one embodiment, the first surface is softer and has a higher coefficient of friction than the second surface. The first surface may be felt, or felt-like, while the second surface may be a hard plastic. The two surfaces are configured to move relative one another. For example, at least one of the first surface or the second surface is rotatable about an axis such that in a first configuration the first surface is arranged to contact a ground surface and in a second configuration the second surface is arranged to contact the ground surface.

In another aspect, a system is provided. The system includes at least two pairs of legs as part of a mobility walker. The pair of front legs may have wheels attached to them. The second pair of legs may be the back legs of the mobility walker. A leg-end module is attached to the end of each of the second pair of legs. Each leg-end module may include at least a first surface and a second surface configured to interface with a ground surface. The two surfaces may have different physical characteristics and one surface may be selected for interfacing with certain ground surfaces while the second surface may be selected for interfacing with other ground surfaces. In some examples, a wheel or wheel-like structure may be attached to the distal ends of the leg-end modules and the two surfaces may be attached to different portions of the wheel or wheel-like structures. The system also includes a surface selector that temporarily allows rotation of at least a portion of at least one of the leg-end modules such that either the first surface or the second surface is maintained in a ground interface position. For example, the surface selector may allow a wheel with the two surfaces attached thereto to rotate from an otherwise biased locked position.

In yet another aspect, a method is provided. The method includes using a selector to determine which of either a first surface or a second surface to cause to interface with a ground surface. The method may further include causing leg-end modules coupled to back legs of a mobility walker to switch from a first surface to a second surface based on the ground surface in a given environment.

In an aspect, another system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
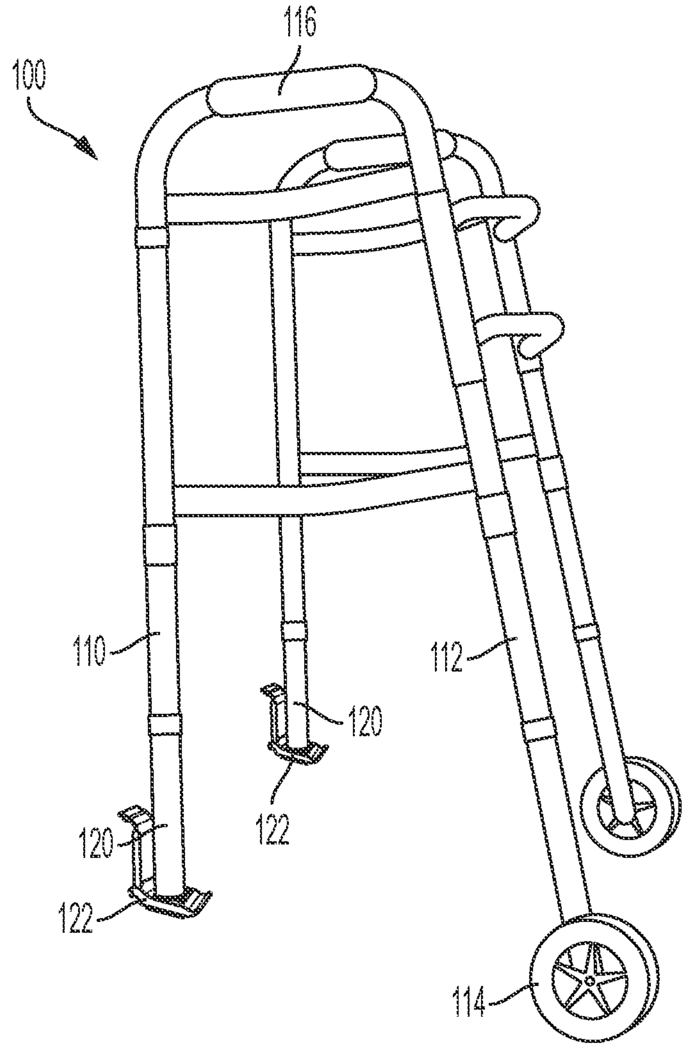
FIG. 1A illustrates a mobility walker with an interchangeable foot attachment, according to an example embodiment.

Example systems, devices, and methods are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to a mobility system and/or device with integrated and interchangeable feet for use on varying surfaces. In particular, the present disclosure relates to a mobility walker and modular attachments thereto. In some embodiments, Mobility walkers, one type of mobility device, are used by millions of people throughout the United States. However, despite the widespread use and commercialization, mobility walkers still have drawbacks, particularly for those that traverse varying surfaces and they move about their day. Typical walkers have two front legs that have wheels and two back legs that commonly have fixed ends, sometimes comprising a rubber or composite material. When using the walker, the wheels on the front two legs roll over most surfaces with limited issues. However, depending on the users balance and coordination, lifting the back two legs off the floor can be difficult, cumbersome, and sometimes cause risk of injury themselves because the surface of the standard back legs may catch on another surface or even just flooring itself.

As such, people starting cutting tennis balls and press-fitting or otherwise attaching them to the rear legs. Utilizing the felt or felt-like surface of the tennis ball allows the rear legs to slide along hard surfaces, protects the flooring from impact from the walker leg directly, and can also make use of the walker quieter than compared to lifting up and placing back down the rear legs repeatedly. However, walker balls have significant drawbacks. First, they can be difficult to install due to the nature of squeezing the legs through one or more slits cut into a tennis ball or similar, even for an able-bodied adult, Second, the installation process commonly includes cutting or sometimes enlarging existing slits in the ball which involves the use of sharp knives, which is not an ideal activity for persons requiring assistance with balance and coordination.

Additionally, while the felt surface on the outside of a walker ball may smoothly slide over hard interior floor surfaces, the felt is not an ideal surface for many other surfaces, such as concrete, asphalt, grass, or other outdoor surfaces. Moreover, the felt surface can easily capture dirt, bacteria, and other contaminants, both outdoors and indoors (e.g. bathrooms), and is difficult to clean. Walker balls also wear easily and because they are difficult to install, walker balls are not easy to replace, especially for people that require assistance from walkers. It is common to see walker balls so worn that the leg of the walker is protruding through the ball itself.

To avoid the difficulty of cutting, installing, having to replace walker balls, people have also created various walker skis or glide attachments that are constructed from a plastic or other hard smooth surface. These walker glides are also commercially available, but do not offer all the advantages of the walker balls, namely the felt or felt-like surface that reduces damage done by the walker on flooring.

As such, there is a need for a device that gives people using mobility walkers the ability to change the surface of the rear legs of the walker to match the type of surface the person is walking along. Such a device may leverage the positive aspects of walker balls and walker glides while avoiding many of the downfalls of such existing technology. Other advantages would be apparent to those skilled in the art.

II. Example Devices and Systems

FIGS. 1A, 1B, 1C, and 1D illustrates a mobility walker 100 and components thereof, according to an example embodiment. The mobility walker 100 includes rear legs 110, front legs 112, front wheels 114 coupled to the front legs 112, and handles 116. The mobility walker 100 also includes leg-end module 120 that is coupled to rear legs 110. In some regards, the leg-end modules 120 may be integrated with rear legs 110 and in some regards, the leg-end modules 120 may be removably coupled to rear legs 110. The leg-end modules 120 are also considered to be leg components 120.

At a distal end of the leg-end module 120, a footing 122 is coupled to the leg-end module 120. The footing 122 includes at least a base component 124, a first surface 126, and a second surface 128. The first surface 126 and the second surface 128 may be constructed from materials that have at least one different physical characteristic than the other. For example, the first surface 126 may be constructed from a first material with a first hardness and a first coefficient of friction. The first surface 126 may be a felt or felt-like surface. The first surface 126 may be constructed from a material such that the first surface 126 reduces damage to a ground surface when the mobility walker 100 contacts the ground surface. For example, a ground surface may include a hard wood flooring or similar flooring that may be damages by impact from the mobility walker 100. The first surface 126 may be selected from a variety of materials in order to limit or reduce potential damage to the flooring from the mobility walker 100. The first surface 126 may be selected from materials to allow easier use of the mobility walker 100 indoors, for example.

The first surface 126 may include one or more layers that are constructed from a felt material or similar that is designed to wear down with time. The different layers are configured to allow the first surface 126 to indicate a certain amount of use or wear over time. In some regards, the first surface 126 is configured to provide visual feedback. Visual feedback may include an indication regarding an amount of wear of the first surface 126. For example, the first surface 126 may have a first color initially as part of an outermost layer of the first surface 126, and over time and use, the outermost layer may wear down such that a second layer is exposed and the second layer may have a second color or otherwise indicate a certain amount of wear on the first surface 126. As such, in certain examples, the first surface 126 may indicate that it is time to change or replace the first surface 126. The first surface 126 may include two or more layers, each of a different color. In some embodiments the first surface 126 may be tri-colored.

The first surface 126 may be press fit into the base 124 of the footing 122. In one embodiment, the base 124 includes cavities 132 that allow access to the first surface 126 such that the first surface 126 can be removed and replaced. The first surface 126 may be replaced with a third surface, the third surface having similar properties as the first surface 126.

The second surface may be constructed from a second material with a second hardness and a second coefficient of friction. The second surface 128 may be a plastic surface. The second surface 128 may be constructed from a material such that the second surface 128 allows the mobility walker 100 to move smoothly over rough or uneven ground surfaces. The second surface 128 may be selected from materials to allow easier use of the mobility walker 100 outdoors, for example. As such, it should be understood that the ground surface may be indoors or outdoors and include any of the variety of materials that an individual using the mobility walker 100 may encounter.

The second surface 128 may be harder and smoother than the first surface 126. The first surface 126 may allow for smoother and lower impact use of the mobility walker 100 in certain environments with certain ground surfaces. The second surface 128 may allow for smoother use of the mobility walker 100 in certain environments with certain ground surfaces. The second surface 128 may not track or collect dirt or bacteria as easily as the first surface 126. As such, the second surface 128 may also be used indoors in certain settings, such as in public or in bathrooms. In some examples, at least one of the first surface 126 or the second surface 128 may be constructed from or include an anti-microbial layer or material.

Figure 1B:
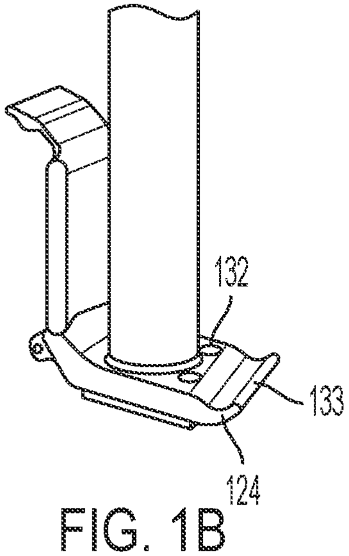
FIG. 1B illustrates an interchangeable foot attachment in a first configuration, according to an example embodiment.
Figure 1C:
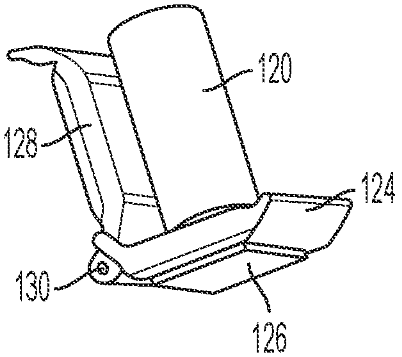
FIG. 1C illustrates an interchangeable foot attachment in a first configuration, according to an example embodiment.
Figure 1D:
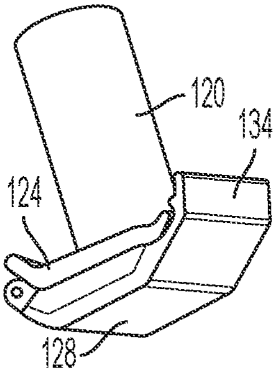
FIG. 1D illustrates an interchangeable foot attachment in a second configuration, according to an example embodiment.

The footing 122 includes a hinge 130 between the first surface 126 and the second surface 128. As such, the first surface 126 and the second surface 128 are moveable relative to one another. FIGS. 1A, 1B, and 1C depicts the leg-end module 120 in a first configuration in which the first surface 126 is arranged or positioned to interface or otherwise contact (including but not limited to glide, slide, or otherwise move across) the ground surface. FIG. 1D depicts the leg-end module 120 in a second configuration in which the second surface 128 is arranged or positioned to interface or otherwise contact the ground surface. In one example embodiment, the second surface 128 may rotate about an axis, such as the axis corresponding to the hinge 130, such that the second surface 128 is positioned to contact the ground surface.

The base 124 of the footing 122 may include an extended portion 133. The second surface 128 may include an extended portion 134 is that corresponds to the extended portion 133 of the base 124. The extend portion 133 may have features, including a toe shape that couples to the extended portion 134 when the footing 122 is in the second configuration depicted in FIG. 1D, for example. The extended portion 134 of the second surface 128 may be accessible to a user of the mobility walker 100 to press the second surface 128 down and around to cover the first surface 126 when going from the first configuration to the second configuration, or release the second surface 128 and expose the first surface 126 when going from the second configuration to the first configuration. For example, the extended portion 134 may allow increase access to the footing 122 and interchanging the footing surface being utilized.

In other example embodiments, other footing components are contemplated and within the scope of the invention disclosed herein. For example, FIGS. 2A, 2B, 2C, 2D, 3A, 3B, and 3C depict a mobility walker system 200 with a wheel component footing. In some regards, the embodiments of FIGS. 2A, 2B, 2C, 2D, 3A, 3B, and 3C may be preferable to the hinge footing because the mechanics of interchanging the first and second surfaces is more accessible to a person requiring help balancing and/or reduced coordination.

The mobility walker system 200 may include component and features similar to those of mobility walker 100 previously described. Similar components will be recognized to have similar functionality, even if not described expressly herein. Moreover, a person of skill in the art would recognize the interchangeability of components and understand that components of the mobility walker system 200 may be included as part of the walker 100, and vice versa.

The mobility walker system 200 include a pair of back legs 210, a pair of front legs 212, a pair of front wheels 214 coupled to the front legs 212, handles 216, and at least one surface selector 218. Leg-end modules 220 are coupled to the pair of back legs 210. A footing or wheel 222 is coupled to the distal end of the leg-end modules 220. Moreover, a first surface 226 and a second surface 228 are coupled to the leg-end modules 220, and more particularly, coupled to an outer surface 224 of the wheel 222. The first surface 226 may be coupled to the outer surface 224 of the wheel 222 at a first location, and the second surface 228 may be coupled to the outer surface 224 of the wheel 222 at a second location.

The mobility walker system 200 is designed to contact and move across a ground surface 240. As described above, the ground surface 240 may be indoors, outdoors, and have a variety of characteristics dependent upon the given environment. A user of the mobility walker system 200 may utilize the surface selector 218 to choose between the first surface 226 and the second surface 228 to be the footing surface of the mobility walker system 200 dependent upon the ground surface 240. Moreover, the first surface 226 may be similar and have similar characteristics and the first surface 126 of mobility walker 100. The second surface 228 may be similar and have similar characteristics and the second surface 128 of mobility walker 100.

Figure 2A:
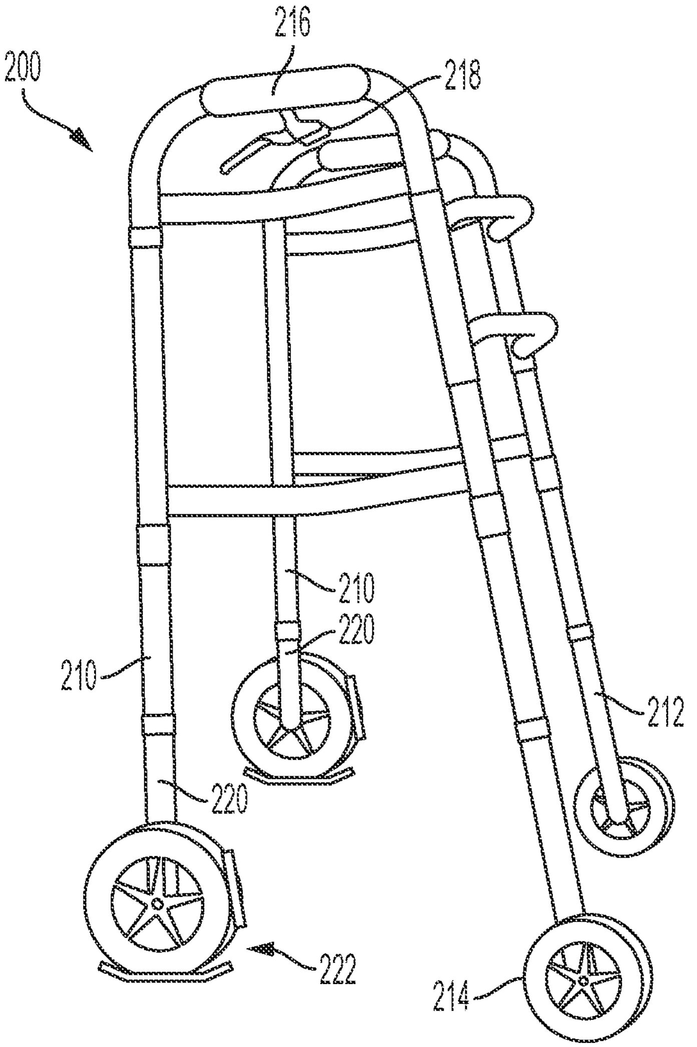
FIG. 2A illustrates a mobility walker with an interchangeable foot attachment, according to an example embodiment.
Figures 2B, 2C, 2D:
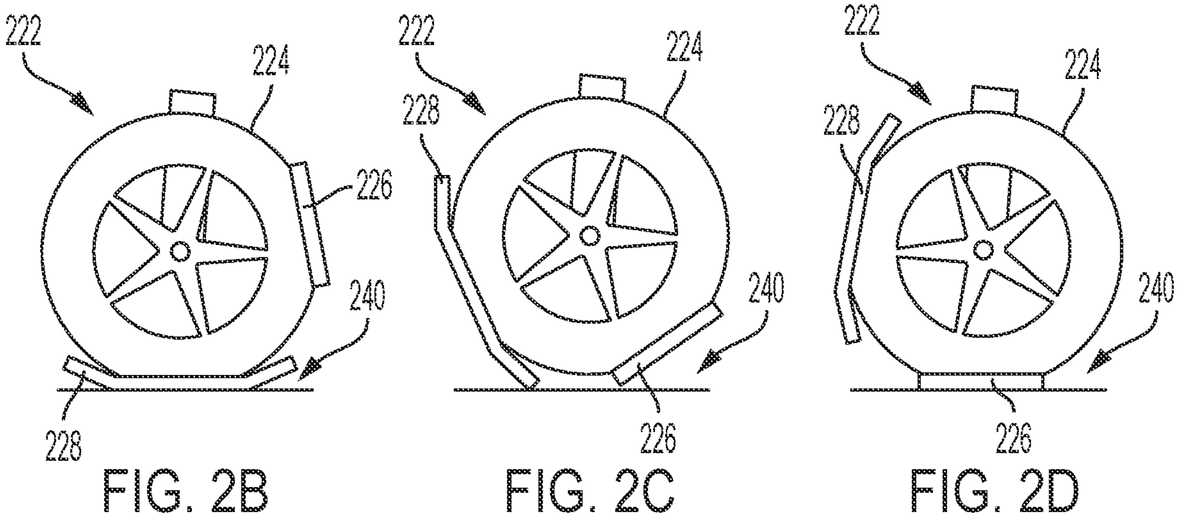
FIG. 2B illustrates an interchangeable foot attachment in a first configuration, according to an example embodiment.
FIG. 2C illustrates an interchangeable foot attachment transitioning between a first configuration and a second configuration, according to an example embodiment.
FIG. 2D illustrates an interchangeable foot attachment in a second configuration, according to an example embodiment.

In FIG. 2B, the second surface 228 is selected to be in contact with the ground 240. To transition and interchange the first surface 226 for the second surface 228, the surface selector 218 or similar release mechanism may be operated such that the wheel 222 is unlocked and allowed to rotate about the wheel axis. As the mobility walker system 200 is moved, the wheel 222 may be rotated as depicted in FIGS. 2C and 2D such that the first surface 226 comes into contact with the ground 240. In this regard, the rear legs 210 do not need to be lifted off the ground in order to change the footing surface in contact with the ground. In some other examples, and in addition to or in place of the brake-like handle depicted, the surface selector 218 may include a button, a switch, a dial, or some other type of handle. The surface selector 218 may actively or passively cause the interchange from the first surface 226 with the second surface 228 or vice versa. Releasing a lock or locking mechanism may be an example of passively causing the interchange from the first surface 226 with the second surface 228 or vice versa by allowing the interchange. Actively causing the interchange may include components of a mechanism that forces the mechanical interchange of the first surface 226 with the second surface 228 or vice versa.

Figure 3C:
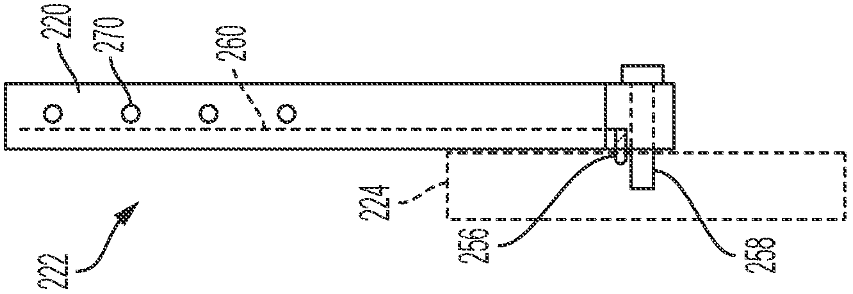
FIG. 3C an interchangeable foot attachment and related components, according to an example embodiment.
Figure 3B:
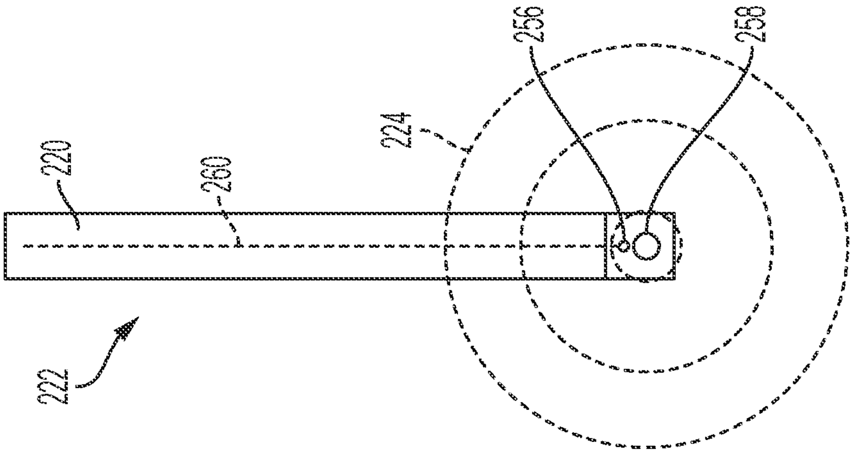
FIG. 3B an interchangeable foot attachment and related components, according to an example embodiment.
Figure 3A:
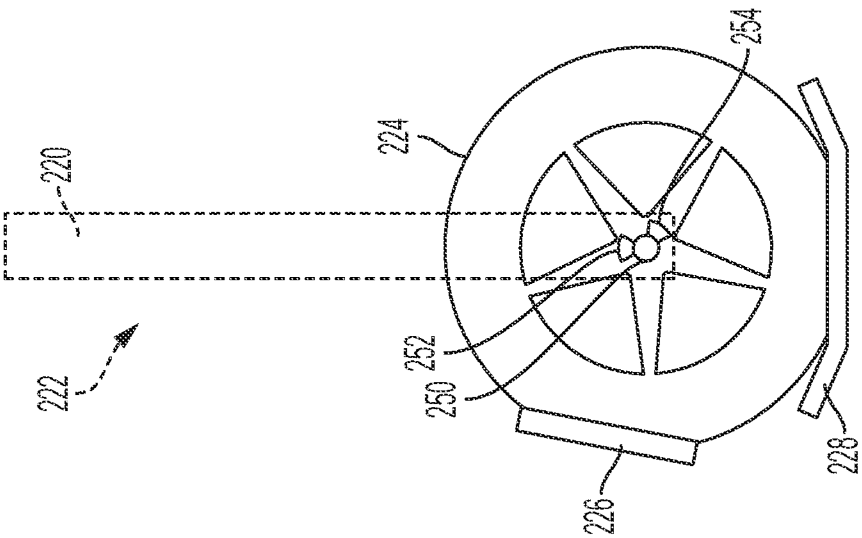
FIG. 3A an interchangeable foot attachment and related components, according to an example embodiment.

FIGS. 3A-3C depict additional details about the surface selector 218 and related components, in one example embodiment. Other known similar systems will be apparent to a person of skill in the art. FIG. 3A depicts the inner side of the wheel 222. As shown in FIG. 3A, the wheel 222 may include a first cavity 254 and a second cavity 252 and be configured to rotate about a wheel axis 250. The first cavity 254 may correspond with the first surface 226. As such the first cavity 254 may be located on an opposite side of the axis of rotation of the wheel 222 from the first surface 226. More specifically, the first cavity may be located on an inner hub of the wheel 222 adjacent to the axis of the wheel 222. Similarly, the second cavity 252 may correspond with the second surface 228. As such the second cavity 252 may be located on an opposite side of the axis of rotation of the wheel 222 from the second surface 228.

Continuing to FIGS. 3B and 3C, a movable protrusion 256 and wheel axle 258 may be coupled to the leg-end module 220. The moveable protrusion 256 is coupled to line 260, which may be considered brake line 260. The line 260 is coupled to the surface selector 218. The moveable protrusion 256 is biased in an extended position such that the movable protrusion 256 is biased to engage either the first cavity 254 or the second cavity 252. When the surface selector 218 is engaged, the protrusion 256 retracts into the tubing of the leg-end module 220 such that the wheel 222 is temporarily allowed to rotate. After being released, the protrusion 256 will extend into the next available cavity of the first cavity 254 and the second cavity 252 such that either the first surface 226 or the second surface 228 is locked into position.

The leg-end module 220 may removably coupled to the rear legs 210 via a telescope locking mechanism. As such the leg-end module 220 may include cavities 270 depicted in FIG. 3C that would correspond to a retractable push button protrusion coupled as part of the rear legs 210. The telescoping locking mechanism allows for attachment of various accessories to the rear legs of a mobility walker.

In an alternative embodiment, the outer surface of the wheel component is also the second surface, and there is no separate second surface material coupled to the wheel surface. In other words, the outer surface of the wheel is designed with the mechanical properties of the second surface. In other alternative embodiments, a footing component may include more than one first surfaces and/or second surfaces without departing from the scope of the invention. For example, a wheeled footing component may include two, separate first surfaces on opposite sides of a second surface. Or in other examples a third surface may be disposed on the footing, the third surface configured for use on a particular type of ground surface.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device, comprising:

a leg component;

a first surface of a first hardness coupled to the leg component;

a second surface of a second hardness coupled to the leg component, wherein at least one of the first surface or the second surface is rotatable about an axis such that in a first configuration the first surface is arranged to contact a ground surface and in a second configuration the second surface is arranged to contact the ground surface; and wherein the second surface is configured to cover the first surface when in the second configuration.

2. The device of claim 1, further comprising a footing coupled to the leg component, wherein the footing comprises the first surface and the second surface.

3. The device of claim 1, wherein the first surface has a first coefficient of friction and the second surface has a second coefficient of friction, and the first coefficient of friction is greater than the second coefficient of friction.

4. The device of claim 1, wherein the first surface is felt or felt-like and the second surface is plastic.

5. The device of claim 1, wherein the first surface is configured to indicate when the first surface should be replaced.

6. The device of claim 5, wherein the first surface indicates when the first should surface should be replaced by an alteration in color.

7. The device of claim 1, further comprising:

a locking component, wherein when in the first configuration the locking component maintains the first surface in a ground interface position, and when in the second configuration the locking component maintains the second surface in the ground interface position.

8. The device of claim 1, wherein the leg component is removably coupled to a mobility walker.

9. A mobility walker system, comprising:

a first pair of legs coupled to a walker, wherein a first wheel is coupled to a first leg of the first pair of legs and a second wheel is coupled to a second leg of the first pair of legs;

a second pair of legs coupled to the walker;

a pair of leg-end modules, wherein a first leg-end module is coupled to a first leg of the second pair of legs and a second leg-end module is coupled to a second leg of the second pair of legs, and wherein each leg-end module comprises a first surface of a first hardness and a second surface of a second hardness, wherein the first surface is felt and the second surface is plastic; and a surface selector temporarily allows rotation of at least a portion of at least one of the leg-end modules such that either the first surface or the second surface is maintained in a ground interface position.

10. The mobility walker system of claim 9, further comprising:

a third wheel coupled to a distal end of the first leg-end module, wherein the first surface of the first leg-end module is coupled to a portion of an outer surface of the third wheel, and wherein engaging the surface selector temporarily allows rotation of the third wheel; and a fourth wheel coupled to a distal end of the second leg-end module, wherein the first surface of the second leg-end module is coupled to a portion of an outer surface of the fourth wheel, and wherein engaging the surface selector temporarily allows rotation of the fourth wheel.

11. The mobility walker system of claim 10, wherein the outer surface of the third wheel is the second surface.

12. The mobility walker system of claim 10, wherein the second surface of the first leg-end module is coupled to a second portion of the outer surface of the third wheel.

13. The mobility walker system of claim 9, wherein engaging the surface selector releases a brake mechanism coupled to the first leg-end module such that a user may disengage the first surface from the ground interface position and engage the second surface in the ground interface position.

14. The mobility walker system of claim 9, wherein the first surface is configured to indicate when the first surface should be replaced.

15. The mobility walker system of claim 14, wherein the first surface is replaceable with a third surface of substantially the same hardness as the first hardness.

16. The mobility walker system of claim 9, wherein at least one of the first surface or the second surface is an antimicrobial surface.

17. A device, comprising:

a leg component;

a first surface of a first hardness coupled to the leg component;

a second surface of a second hardness coupled to the leg component, wherein at least one of the first surface or the second surface is rotatable about an axis such that in a first configuration the first surface is arranged to contact a ground surface and in a second configuration the second surface is arranged to contact the ground surface; wherein the first surface is felt or felt-like and the second surface is plastic or a durable composite material.

18. The device of claim 17, wherein the first surface is coupled to an outer surface of a wheel component coupled to a distal end of the leg component at a first location, and wherein the second surface is coupled to the outer surface of the wheel component at a second location that is different from the first location.

19. The device of claim 17, further comprising a footing coupled to the leg component, wherein the footing comprises the first surface and the second surface.

20. The device of claim 17, wherein the leg component is removably coupled to a mobility walker.

* * * * *